United States Patent [19]

Mizutani et al.

[11] Patent Number: 5,370,212
[45] Date of Patent: Dec. 6, 1994

[54] AUTOMATIC PALLET CHANGER METHOD AND APPARATUS

[75] Inventors: Takashi Mizutani; Hirohiko Honda; Wataru Kobayashi, all of Numazu; Toshihiro Ueta, Mishima, all of Japan

[73] Assignee: Toshiba Kikai Kabushiki Kaisha, Tokyo, Japan

[21] Appl. No.: 985,275

[22] Filed: Dec. 3, 1992

[30] Foreign Application Priority Data

Dec. 4, 1991 [JP] Japan .................................. 3-320611

[51] Int. Cl.⁵ .............................................. B65G 37/00
[52] U.S. Cl. .............................. 198/346.1; 198/465.1; 198/468.11
[58] Field of Search .... 198/346.1, 346.2, 465.1–465.3, 198/468.2, 468.9, 468.11, 803.01; 414/280

[56] References Cited

U.S. PATENT DOCUMENTS

| 4,705,445 | 11/1987 | Morita et al. | 198/346.1 X |
|---|---|---|---|
| 4,802,569 | 2/1989 | Aidlin et al. | 198/346.1 |
| 4,995,502 | 2/1991 | Kitamura | 198/346.1 |
| 4,996,754 | 3/1991 | Kitamura | 198/346.1 X |
| 5,044,486 | 9/1991 | Kitamura | 198/346.1 |
| 5,062,190 | 11/1991 | Kitamura | 198/346.1 X |

FOREIGN PATENT DOCUMENTS

| 0234133 | 9/1989 | Japan | 198/346.1 |
|---|---|---|---|
| 403149153A | 6/1991 | Japan | 198/346.1 |

*Primary Examiner*—D. Glenn Dayoan
*Attorney, Agent, or Firm*—Cushman, Darby & Cushman

[57] ABSTRACT

An automatic pallet changer comprising a reciprocating device (11) which is moved in a reciprocating motion toward a machine side and arranged between at least two pallet stations (13a) and (13b) on a pallet supporting base (10), pallet engaging device (17 to 20) which are provided at two points at the front of and at two points at the back of the reciprocating device (11) and adapted to detachably engage engaging portions (23) of the pallets (1a, 1b), a first driving device (31 to 36) for driving the reciprocating device and a second driving device (37 to 39) for driving the pallet engaging devices (17 to 20).

8 Claims, 4 Drawing Sheets

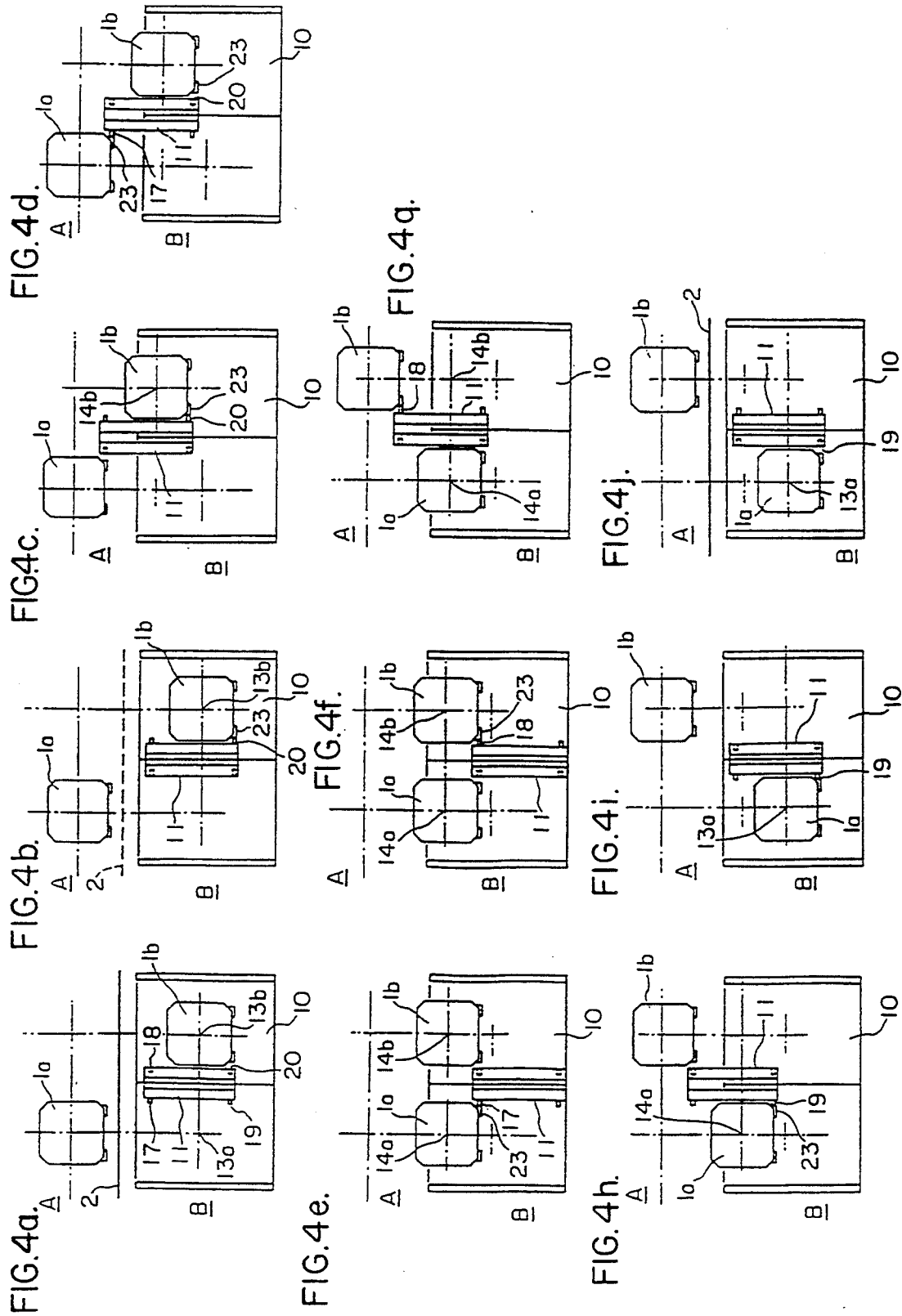

AUTOMATIC PALLET CHANGER METHOD AND APPARATUS

FIELD OF THE INVENTION

This invention relates to an automatic pallet changer (APC) used in the vicinity of a machining center, and more particularly to an automatic pallet changer of a parallel shuttle type by which a reduction of pallet changing time is achieved.

BACKGROUND OF THE INVENTION

Parallel shuttle types of automatic pallet changers for alternately changing two pallets located parallel to each other are known, for example, from JP-A-58-71045, in which hooks adapted to engage pallets are moved in a reciprocating motion along pallet-placing rails by means of chain mechanisms, and also from JP-A-62-166942, in which hooks adapted to engage pallets are provided at the ends of two hydraulic cylinders, which are alternately actuated to perform operations of changing the pallets.

However, in the above-described conventional devices, the operations of changing the pallets are performed by a plurality of (for example, two) actuators arranged independently of each other with respect to the respective pallets. Thus, the conventional devices had disadvantages in that the efficiency of operations of the actuators is lower, since, while one of the actuators is being operated, the other is stopped.

Furthermore, the devices had a further disadvantage in that the need of arranging the plurality of actuators made the driving system complicated and larger-sized.

SUMMARY OF THE INVENTION

An object of the invention is to provide an automatic pallet changer which permits the pallet-conveying time to be reduced and the size of the device to be miniaturized by operating an actuator efficiently.

In order to achieve the above-described object, an automatic pallet changer for automatically changing at least two pallets between the respective pallet station and the machine according to the invention, comprises a pallet supporting base having at least two pallet stations; a reciprocating means disposed between said two pallet stations on the pallet supporting base and moved in a reciprocating motion toward the machine; pallet engaging means provided at two points at the front of and at two points at the back of the reciprocating means and adapted to detachably engage the engaging portion of the pallet; first driving means for driving the reciprocating means; and second driving means for operating the pallet engaging means.

In the operation of the automatic pallet changer of the invention, a pallet at the pallet station is engaged by the pallet engaging means at the back of the reciprocating means and the reciprocating means is moved toward the machine to thereby convey the pallet to a position of one of the intermediate stations and stop it temporarily. In this state, another pallet at the machine is engaged by the pallet engaging means at the front of the reciprocating means and the reciprocating means is moved toward the pallet station to thereby convey the pallet from the machine to the other intermediate station and to stop it temporarily. Subsequently, the reciprocating means is moved toward the machine to thereby convey the pallet at the one intermediate station to a predetermined position in the machine with the pallet engaging means at the front, and the reciprocating means is moved again toward the pallet station to thereby convey the pallet at the other intermediate station to a predetermined position in the pallet station with the pallet engaging means at the back.

BRIEF DESCRIPTION OF THE DRAWING

Other objects and aspects of the invention will become apparent from the following description of an embodiment with reference to the accompanying drawings in which:

FIG. 4 is a fragmentary view showing a series of operations in order of step and for changing pallets by the device according to the invention.

DETAILED DESCRIPTION OF THE INVENTION

Now, one embodiment of the invention will be described with reference to FIGS. 1 to 4.

Figure 1:
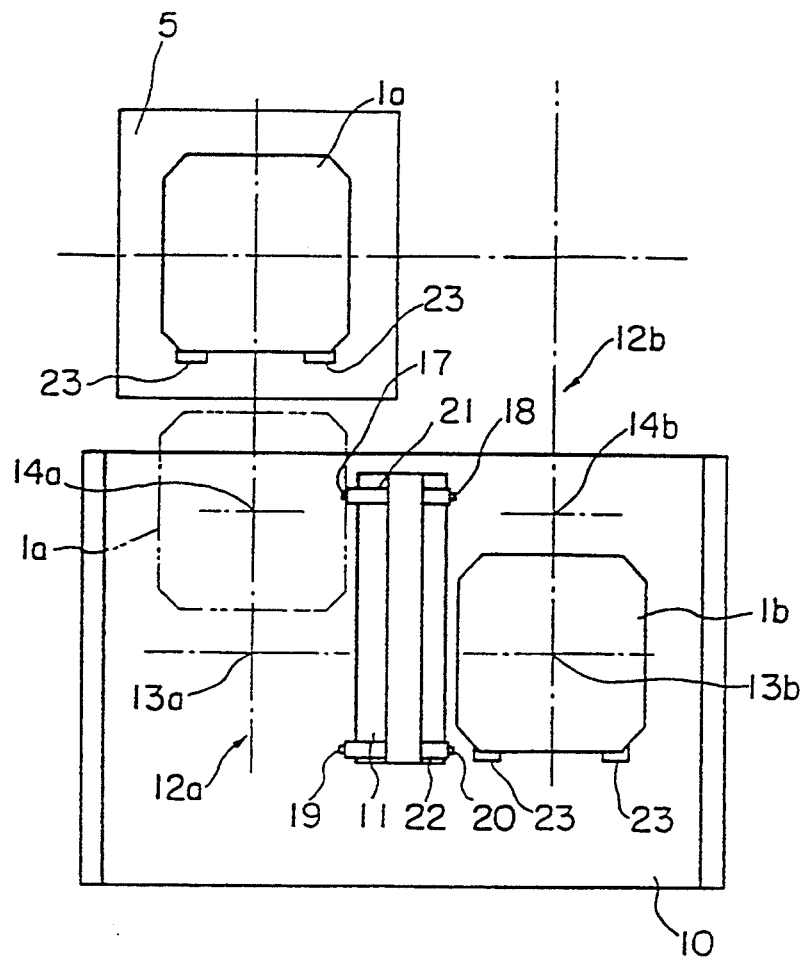
FIG. 1 is a fragmentary plan view showing an embodiment of an automatic pallet changer according to the invention.
Figure 2:
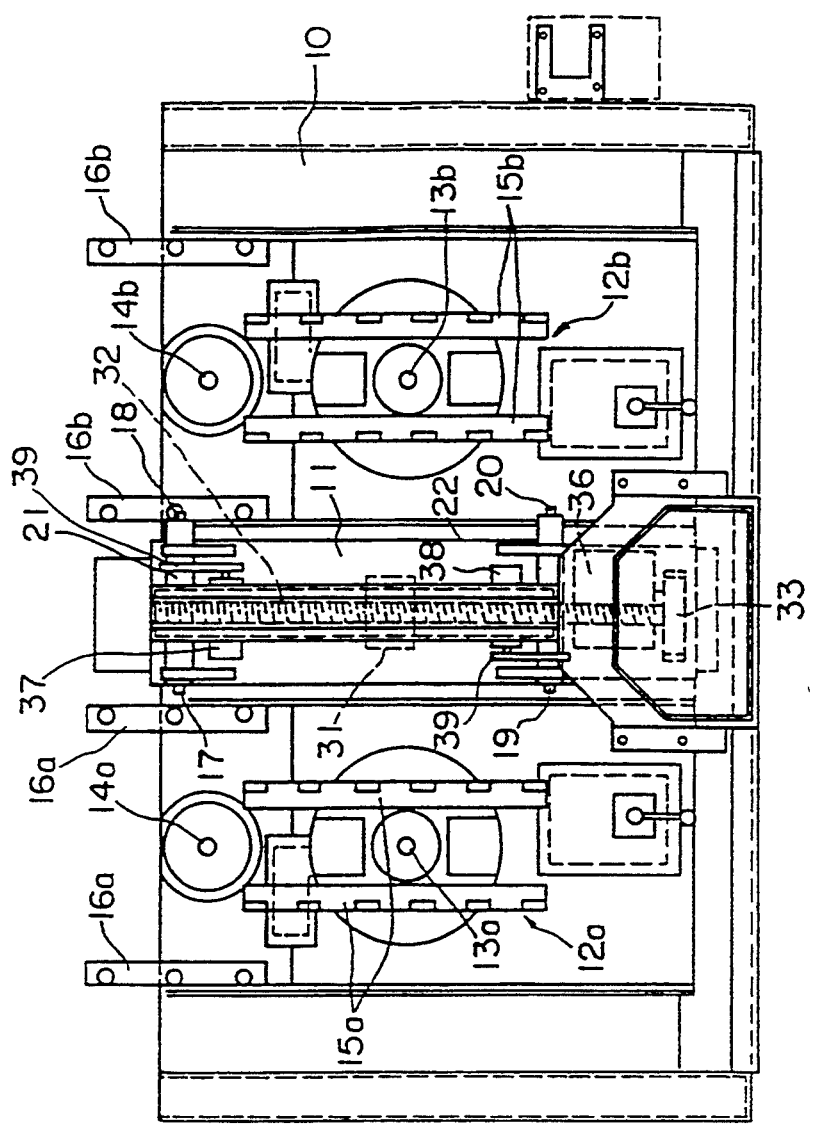
FIG. 2 is a plan view showing an embodiment of an automatic pallet changer according to the invention.
Figure 3:
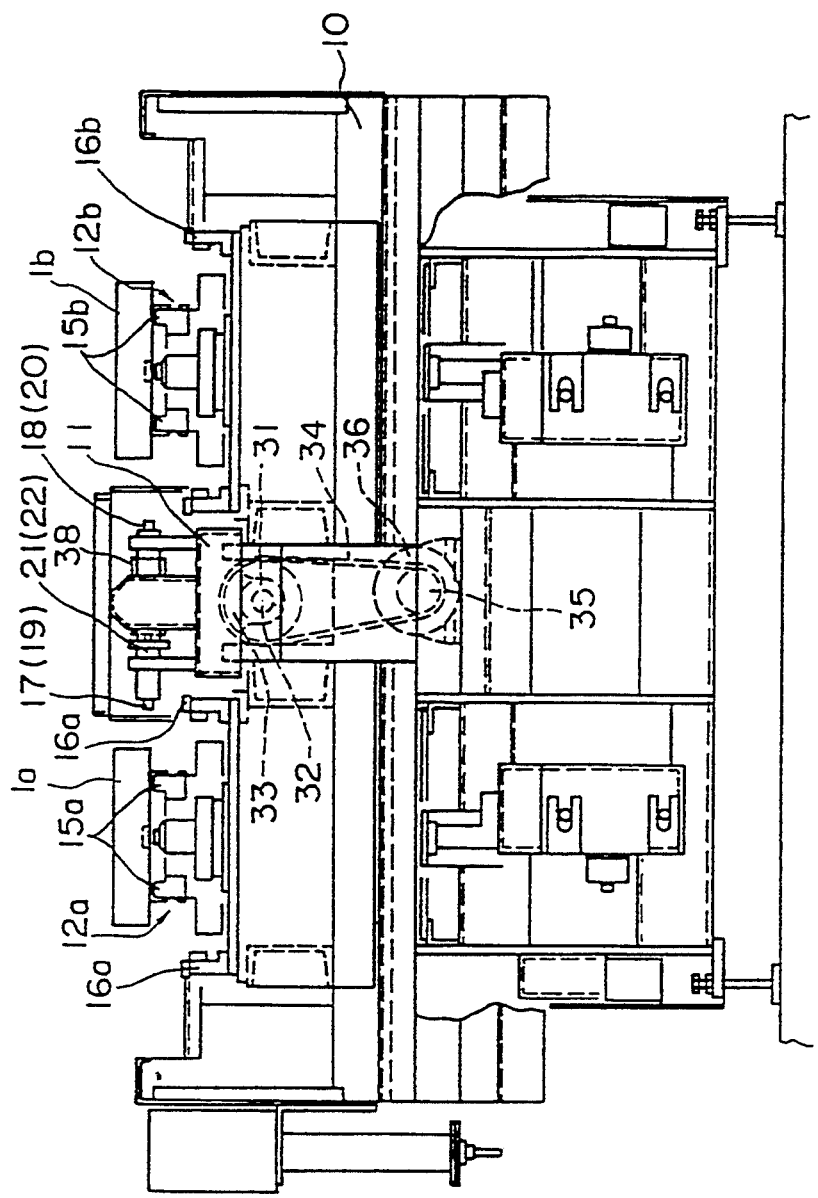
FIG. 3 is a front view of the device shown in FIG. 2.

Referring to FIGS. 1 to 3, a reference 10 designates a pallet supporting base which has, at substantially the center of the width thereof, a conveying arm 11 extending in the forward and backward directions (the upper and lower direction in FIG. 1) and supported for movement in the back and forth direction. The conveying arm 11 is provided at both sides thereof with a pair of pallet changing parts 12a and 12b parallel to the conveying arm 11 to move two pallets 1a and 1b parallel to each other.

The pallet changing parts 12a and 12b have respective pallet stations 13a, 13b and intermediate positions 14a, 14b set to fix the pallets 1a and 1b to the respective positions through locking cylinders (not shown), and the pallet stations 13a, 13b and the intermediate positions 14a, 14b are connected by first rails 15a, 15b, respectively. Furthermore, the second rails 16a and 16b extending from the intermediate positions 14a and 14b toward the machine are laid. Respective locking mechanisms (not shown) are provided at the pallet stations 13a, 13b and the intermediate positions 14a, 14b to engage the bottoms of the pallets in position and lock them.

The conveying arm 11 has a ball nut 31 fixedly provided at the lower surface thereof, which is engaged by a ball screw 32 arranged in the direction of reciprocating motion of the conveying arm 11. The ball screw 32 is rotatably supported at both ends thereof and has a pulley 33 secured to one end thereof. The pulley 33 is connected through a timing belt 34 to a driving pulley 35 arranged at a lower position, and which is driven in rotation by a drive motor 36.

The conveying arm 11 is provided with hooks 17 to 20 in the front and back positions thereof at two points at each position (a total of four points). The one pair of hooks 17 and 18 positioned at the front are firmly secured to both ends of a shaft 21 and the other pair of hooks 19 and 20 are firmly secured to both ends of a shaft 22. At the positions adjacent to the respective shafts 21 and 22, actuators (for example, hydraulic cylinders) 37 and 38, each having a rod moved in advancing and retreating motion parallel to the shafts 21, 22, are disposed and they are connected through connecting bars 39 to the shafts 21 and 22, respectively. Each of the pallets 1a, 1b is provided at its one end (the ends at the lower edge of the pallet in FIG. 1) with engaging portions 23 (for example, recesses) engaged by the hooks 17 to 20.

Now, a series of automatic changing operations of the pallets 1a, 1b in the above-described embodiment will be described with reference to FIG. 4.

That is, as shown in FIG. 4(a), one pallet 1a is clamped on a working table 5 (refer to FIG. 1) on the machine side A and work is performed on the pallet disposed in the center of the machine, while the other pallet 1b is at the pallet station 13b of the changer side B and set-up is performed. At this time, the pallet 1b is locked by the locking mechanism (not shown) provided below the pallet 1b.

To perform the pallet changing operations of transferring the pallet 1a on the machine side A from this initial position to the position of the other empty pallet station 13a and the pallet 1b at the pallet station 13b in the changer side B to a predetermined position on the machine side A, respectively, first a splash cover 2 separating a cutting region from the changer is opened, as shown in FIG. 4(b). Then, the actuator 38 is operated to move the shaft 22 toward the pallet 1b to extend the hook 20 outwardly until it is inserted into and brought into engagement with the engaging portion of the pallet 1b. Thereafter, the locking mechanism is so operated that the pallet 1b is released from the locked state.

In this state, the drive motor 36 is driven to rotate the ball screw 32 through the pulley 35, the timing belt 34 and the pulley 33. Thus, as shown in FIG. 4(c), the conveying arm 11 is advanced toward the machine side A together with the ball nut 32 to thereby transfer the pallet 1b to the intermediate position 14b. Then, as shown in FIG. 4(d), the hook 20 positioned at the back is withdrawn to be brought out of engagement with the engaging portion 23 of the pallet 1b and, at the same time, the actuator 37 is operated to extend the one hook 17 positioned at the front outwardly until it is brought into engagement with the engagement portion 23 of the pallet 1a. Then, the conveying arm 11 is moved backward until the pallet 1a is transferred to the intermediate position 14a, as shown in FIG. 4(e).

As shown in FIG. 4(f), with the working table 5 moved to the position facing the pallet 1b, the actuator 37 is operated to withdraw the one hook 17 positioned at the front and, at the same time, extend the other hook 18 outwardly so that the hook 17 is brought out of engagement with the engagement portion 23 of the pallet 1a and, at the same time, the hook 18 is brought into engagement with the engagement portion 23 of the pallet 1b. In this state, as shown in FIG. 4(g), the conveying arm 11 is advanced toward the machine side A to thereby transfer the pallet 1b from the intermediate position 14b to a predetermined position on the working table 5.

Then, as shown in FIG. 4(h), the pallet 1b is clamped on the working table 5 and, at the same time, the hook 18 positioned at the front of the conveying arm 11 is shifted to be brought out of engagement with the engaging portion of the pallet 1b. The one hook 19 positioned at the back is extended outwardly to be brought into engagement with the engaging portion 23 of the pallet 1a, and thereafter, the conveying arm 11 is moved backward to the changer side B, as shown in FIG. 4(i). Thus, the pallet 1a with a machined work (not shown) thereon is conveyed to the position of the pallet station 13a. Then, as shown in FIG. 4(j), the hook 19 is withdrawn inwardly and the pallet 1a is locked by the locking mechanism. Subsequently, the splash cover 2 is closed and the series of pallet changing operation is completed.

In this way, the increase in the number of times when the hooks 17 to 20 of the conveying arm 11 engage with the engagement portions of the pallets 1a, 1b, enables the change of the pallets to be performed with the forward and backward stroke of the conveying arm 11 acting as one reciprocating part of the distance between both pallets 1a and 1b, that is, one reciprocation between the starting position of the change and the intermediate position and one reciprocation between the intermediate position and the finished position of the change, whereby a reduction of the pallet changing time can be achieved.

Since the automatic pallet changer according to the invention has the construction as described above, when a pallet on the machine side and another pallet at the pallet station in the changer side are changed with each other, the moving distance of the conveying arm necessary for changing the pallets is made half that of the prior art, thereby enabling a reduction of the pallet changing time to be achieved, even if the number of times the hooks are engaged and disengaged becomes more. Moreover, since two pallets can be conveyed and changed by the reciprocating motion of one conveying arm, the reciprocating means can be effectively operated and, at the same time, miniaturization of the changer and simplification of the construction can be achieved.

What is claimed is:

1. An automatic pallet changer for automatically changing at least two pallets between respective pallet stations and a machine, which comprises:

a pallet supporting base having at least two said pallet stations thereon;

a reciprocating means arranged in position between said two pallet stations on said pallet supporting base for moving in a reciprocating motion toward and away from said machine;

pallet engaging means provided at the front end and at the back end of said reciprocating means for engaging engaging portions of said pallets, said pallet engaging means engaging at least one pallet each time said reciprocating means is moved, thereby causing said at least one pallet to move;

a first driving means for driving said reciprocating means; and a second driving means for operating said pallet engaging means.

2. An automatic pallet changer as claimed in claim 1, wherein said pallet supporting base is provided with at least two intermediate stations at which the pallet is temporarily stopped.

3. An automatic pallet changer as claimed in claim 1, wherein said reciprocating means consists of an elongated arm member extending in a pallet moving direction, which has pallet engaging means mounted thereon at two points at the front of and at two points at the back of said arm member.

4. An automatic pallet changer as claimed in claim 3, wherein said first driving means comprises a nut means fixedly secured to the lower surface of said arm member; a screw means threadably engaged by said nut means; and a means for driving in rotation said screw means.

5. An automatic pallet changer as claimed in claim 1, wherein said pallet engaging means has hooks which are inserted in and engage engaging portions of said pallets.

6. An automatic pallet changer as claimed in claim 5, wherein said pallet engaging means includes members moved in the direction perpendicular to the moving direction of said reciprocating means and said hooks are attached to the ends of said members.

7. An automatic pallet changer as claimed in claim 6, wherein said second driving means comprises actuators connected to said members to which said hooks are attached.

8. A method for changing automatically first and second pallets between respective first and second pallet stations and a working station using a moveable pallet conveying device having a first end which is engagable with a pallet and a second end opposite said first end which is engagable with a pallet, which comprises the steps of:

engaging said first end of said pallet conveying device with said first pallet located at said first pallet station;

moving said pallet conveying device to thereby move said first pallet to an intermediate first pallet position;

disengaging said first end of said pallet conveying device from said first pallet and engaging said second end of said pallet conveying device with said second pallet located at said working station;

moving said pallet conveying device to thereby move said second pallet to an intermediate second pallet position;

disengaging said second end of said pallet conveying device from said second pallet and engaging said second end of said pallet conveying device with said first pallet;

moving said pallet conveying device to thereby move said first pallet to said working station;

disengaging said second end of said pallet conveying device from said first pallet and engaging said first end of said pallet conveying device with said second pallet;

moving said pallet conveying device to thereby move said second pallet to said second pallet station; and disengaging said first end of said pallet conveying device from said second pallet.

* * * * *